Patented Sept. 22, 1925.

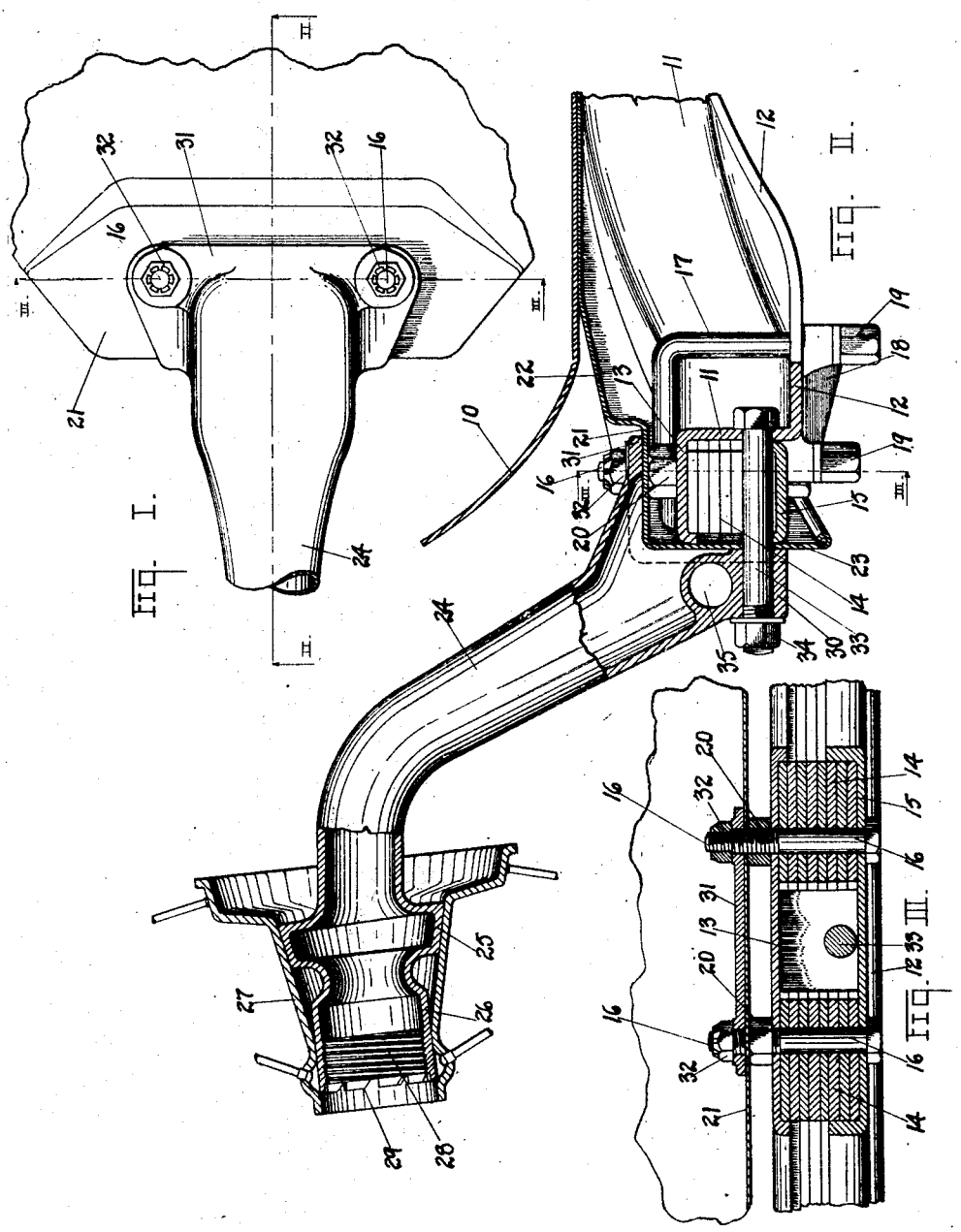

1,554,398

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

WHEEL CARRIER.

Application filed September 7, 1920. Serial No. 408,653.

*To all whom it may concern:*

Be it known that I, EDWARD H. BELDEN, residing at Toledo, county of Lucas, State of Ohio, have invented certain new and useful Improvements in Wheel Carriers, of which I declare the following to be a full, clear, and exact description.

My invention relates to improvements in wheel carriers and has for its object to provide a wheel support which is simple in construction, light in weight and inexpensive to manufacture and which is constructed in such a manner as to permit of the ready attachment and detachment of a wheel to and from the same.

Another object of the invention is to provide an improved wheel carrier, in combination with a vehicle frame and the supportings springs therefor, with common means for connecting the carrier and springs to the frame.

Another object of the invention is to provide, in combination with a cover plate for the rear springs and frame portion of an automobile, an improved wheel carrier adapted to be secured to and supported by said cover plate.

Another object of the invention is to provide an improved wheel carrier and cover plate construction for the rear frame portion of an automobile with common means for connecting said parts together.

Another object of the invention is to provide an improved wheel supporting bracket adapted for connection to the frame of an automobile and arranged to receive a locking member for preventing the removal of the tire from the wheel.

To these and other ends the invention comprises certain novel features of construction and arrangement of parts as will be hereinafter more fully pointed out and claimed, it being apparent to those skilled in the art that the invention shown and described herein is susceptible of various modifications, embodiments and arrangements to suit special or varying conditions and I wish it to be understood that the terms which I have used are merely descriptive and not limiting and that it is my intention to include any and all modifications which come within the scope of the invention as expressed in the appended claims.

A structure constituting one embodiment of my invention is illustrated in the accompanying drawing in which:

Figure I is a fragmentary plan of a portion of a wheel supporting bracket illustrating the manner of connecting the same with the rear portion of an automobile.

Figure II is a sectional elevation taken one line II—II of Figure I and

Figure III is a transverse sectional elevation taken on line III—III of Figures I and II.

Similar reference numerals refer to similar parts throughout the several views of the drawings.

Referring to the drawings I have shown a portion of the rear end of a motor vehicle comprising the body 10 and a portion of the frame for supporting the same comprising the web 11 having the forwardly and rearwardly extending flanges 12 and 13 respectively as shown in Figure II. Projecting beneath the flange 13 in rear of the web 11 are the inner ends of the oppositely extending springs 14 beneath which is disposed a tie bar 15, said spring ends being clamped between the flange 13 and tie bar 15 by means of the vertically disposed bolts 16 as shown in Figure III. The inner ends of the springs are also connected with the frame by means of the U-bolts 17 as shown in Figure II, a connection 18 being provided for the lower ends of the U-bolts which is disposed upon the bottom of the flange 12, said connection being held against displacement by the nuts 19 on the lower ends of the U-bolts. The bolts 16 are provided with nuts 20 which support the horizontal portion 21 of the cover plate 22 extending downwardly and rearwardly from the body 10, said cover plate being recessed centrally of the body of the vehicle to provide the horizontal portion 21 thereof which terminates in a downwardly extending portion 23 at the rear of the inner ends of the springs 14 to cover and protect the same. The wheel carrier or support comprises a tubular body portion 24 in the form of an arm, on the outer end of which is formed the annular hub receiving portions 25 and 26 adapted to engage the inner peripheral wall of the hub 27 of a wheel, said annular portion 26 being threaded inwardly as indicated at 28, the outer edge of said portion being notched as indicated at 29 in order that the detent of the hub cap locking mechanism (not shown) may engage within the notches to prevent accidental unscrewing of the locking member from the threaded portion 28 of the wheel carrier. The opposite end of the carrier is provided with the vertically and horizontally disposed base portions 30 and 31 respectively which rest upon the horizontal and vertically disposed portions 21 and 23 of the cover plate as shown in Figure II. The upper ends of the bolts 16 are extended through the horizontal base portion 31 of the wheel carrier, said bolts being provided with nuts 32 by means of which said base portion 31 is clamped upon the cover plate. A horizontally disposed bolt 33 is extended through the web 11 of the frame member and rearwardly between the ends of the springs 14 and through the vertical portion 23 of the cover plate and base portion 30 of the carrier, said bolt having a nut 34 on its outer end engaging the rear face of the portion 30 of the carrier to clamp the latter upon the vertical portion 23 of the cover plate. Immediately above the bolt 33 and through the downwardly extending portion 30 of the carrier is provided a recess or opening 35 adapted to receive a chain or other suitable locking element (not shown) which may be provided for encircling the tire of the wheel to prevent removal of the same therefrom. The base portion 30 of the carrier is made considerably thicker at its center than at its sides to provide sufficient material above the bolt 33 to afford a good size opening for receiving the tire retaining or locking means for preventing theft of the tire from the wheel. The tire carrier is preferably of hollow construction throughout its length and comprises a single unit adapted for attachment to the rear of the automobile frame for carrying the spare wheel and as above stated is constructed at its outer end to receive a portion of the hub cap locking mechanism for securing the wheel upon the carrier.

While the structure herein shown and described is admirably adapted to fulfill the objects primarily stated, it is to be understood that various changes in form, proportion and details of construction of the carrier may be resorted to without departing from the spirit of the invention as expressed in the claims.

Having thus described my invention what I claim as new and desire to cover by Letters Patent is:

1. In a device of the class described, the combination of a vehicle body, a supporting frame therefor having a web provided with oppositely extending flanges, springs having their inner ends disposed upon said frame in spaced relation, bolts co-operating with said flanges to hold said spring ends upon said frame, a wheel support secured by said bolts and an additional bolt extending through the web of said frame member between said spring ends and connected with said wheel support.

2. In a device of the class described, the combination of a vehicle frame, supporting springs therefor having their inner ends disposed upon said frame in spaced relation, bolts connecting the ends of said springs with said frame, a wheel support secured by said bolts and an additional bolt connected with the frame and extending between the ends of said springs and connected with said wheel support.

3. In a device of the class described, the combination of a vehicle frame, supporting springs for the same having their inner ends disposed upon the frame in spaced relation, bolts connecting said spring ends with said frame, a cover plate supported by said bolts, a wheel support having angularly disposed base portions, one of which is secured by said bolts and a bolt extending between the ends of the springs and serving to connect the other of said angularly disposed base portions with said frame.

4. In a device of the class described, the combination of a vehicle frame having a web provided with a laterally extending flange, supporting springs for the frame having their inner ends disposed in spaced relation upon said flange, bolts connecting said spring ends with said flange and a depending vertical portion substantially parallel with said web, a wheel support having angularly disposed base portions seated upon the horizontal and depending portions of said plate, a bolt passing through said web between the ends of said springs and through said depending plate portion and adapted to secure one of the angularly disposed portions of said wheel support thereon and bolts extending through said spring ends, said flange and said cover plate and serving to connect the other of said angularly disposed base portions therewith.

5. In a device of the class described, the combination of a vehicle frame having a vertically disposed web with a rearwardly extending flange thereon, supporting springs for the frame having their inner ends disposed thereon in spaced relation, a tie plate for the adjacent ends of said springs, vertically disposed bolts extending through said tie plate, said spring ends and said flange, a horizontally disposed bolt extending through said web and projecting rearwardly therefrom between the ends of the springs and a wheel support having angularly disposed base portions secured by said bolts.

6. In a device of the class described, the combination of a vehicle frame having a vertically disposed web and a rearwardly extending flange thereon, supporting springs for the frame having their inner ends positioned upon said flange in spaced relation, a tie bar for said spring ends, a cover plate overlying said flange having a downwardly extending portion at the rear of said spring ends, bolts extending upwardly through said tie bar and said spring ends and projecting through said cover plate, a bolt extending through said web between said spring ends and through the downwardly extending portion of the cover plate and a wheel support having angularly disposed base portions secured by each of said bolts.

7. In a device of the class described, the combination of a vehicle frame supporting springs having their inner ends disposed upon said frame, a cover plate for the frame provided with angularly disposed portions, a wheel support having angularly disposed base portions seated upon the angularly disposed portions of said cover plate, common means connecting one of said base portions with said spring ends, said frame and said cover plate and additional means connecting the other of said angularly disposed base portions with said frame.

8. In a device of the character described, a frame structure, including angular plate members, one overlying the other, and having portions substantially at right angles to each other, springs carried by said frame structure, a wheel support having a base provided with portions adapted to overlie said plate portions and bolts extending therethrough and through said plate members substantially at right angles to each other, certain of said bolts being adapted for clamping the springs to the frame structure.

9. In a device of the character described, a frame structure including angular plate members, one overlying the other and having substantially horizontal and vertical portions, springs carried by said frame structure, a wheel support having a base provided with portions corresponding to the horizontal and vertical portions of said frame, and a plurality of bolts extending through said corresponding portions and through the underlying plate members, certain of said bolts being adapted for clamping the springs to the frame structure.

10. In a device of the class described, a frame structure including angular plate members, one overlying the other, springs carried by said frame structure, a wheel support attachable thereto, said support having a pair of attaching portions extending at substantially right angles to each other, and separate securing means extending through each of said portions and through said plate members, certain of said securing means being adapted for clamping the springs to the frame structure.

In testimony whereof, I affix my signature.

EDWARD H. BELDEN.